United States Patent
Hsu et al.

(10) Patent No.: US 12,487,774 B2
(45) Date of Patent: Dec. 2, 2025

(54) BOARD MANAGEMENT CONTROLLER AND METHOD FOR STORING SENSOR DATA IN BOARD MANAGEMENT CONTROLLER

(71) Applicant: Jabil Circuit (Singapore) Pte. Ltd., Singapore (SG)

(72) Inventors: Shuo-Hung Hsu, New Taipei (TW); Po-Hsun Hu, New Taipei (TW); Chih-Wei Lee, New Taipei (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/421,309

(22) Filed: Jan. 24, 2024

(65) Prior Publication Data
US 2024/0370200 A1 Nov. 7, 2024

(30) Foreign Application Priority Data
May 5, 2023 (CN) .......................... 202310498192.2

(51) Int. Cl.
*G06F 3/06* (2006.01)

(52) U.S. Cl.
CPC .......... *G06F 3/0656* (2013.01); *G06F 3/0604* (2013.01); *G06F 3/0673* (2013.01)

(58) Field of Classification Search
CPC ..... G06F 3/0656; G06F 3/0604; G06F 3/0673
See application file for complete search history.

(56) References Cited

U.S. PATENT DOCUMENTS

| | | | | |
|---|---|---|---|---|
| 6,496,790 | B1* | 12/2002 | Kathavate | G01R 31/317 |
| | | | | 702/188 |
| 8,935,509 | B2 | 1/2015 | Chen et al. | |
| 2004/0249913 | A1* | 12/2004 | Kaufman, Jr. | G06F 11/3065 |
| | | | | 714/E11.207 |
| 2006/0158325 | A1* | 7/2006 | Cha | H04L 67/125 |
| | | | | 340/521 |
| 2012/0110308 | A1* | 5/2012 | Chen | G06F 11/3031 |
| | | | | 712/E9.016 |
| 2014/0215489 | A1* | 7/2014 | Bhatia | G06F 9/546 |
| | | | | 719/313 |
| 2021/0208869 | A1* | 7/2021 | Nachimuthu | G06F 8/656 |
| 2023/0153255 | A1* | 5/2023 | Tan | G06F 13/1668 |
| | | | | 710/105 |

* cited by examiner

*Primary Examiner* — Ryan Bertram
(74) *Attorney, Agent, or Firm* — Young Basile Hanlon & MacFarlane, P.C.

(57) ABSTRACT

A method includes steps of: storing an entry of sensing data in a storage area of a storage module of a board management controller as sensor data; assigning a buffer area of the storage module with a locked state; copying the sensor data from the storage area to the buffer area; and assigning the buffer area with an unlocked state. A processing module of the board management controller does not respond to a request to access the sensor data when the buffer area is assigned with the locked state, and responds to the request to access the sensor data when the buffer area is assigned with the unlocked state.

13 Claims, 5 Drawing Sheets

BOARD MANAGEMENT CONTROLLER AND METHOD FOR STORING SENSOR DATA IN BOARD MANAGEMENT CONTROLLER

CROSS-REFERENCE TO RELATED APPLICATION

This application claims priority to Chinese Invention Patent Application No. 202310498192.2, filed on May 5, 2023, and incorporated by reference herein in its entirety.

FIELD

The disclosure relates to a board management controller, and more particularly to a board management controller that involves a method for storing sensor data related to a sensor.

BACKGROUND

A conventional server includes a board management controller (BMC). The BMC would collect multiple entries of sensor data from a plurality of sensors. The sensors are exemplarily temperature sensors, voltage sensors, current sensors or the like. The BMC would store the entries of sensor data thus collected in shared memory (SHM) to update those entries of sensor data that have been stored in the SHM. It should be noted that errors may occur when device(s) other than the BMC access the SHM during the BMC storing the entries of sensor data.

SUMMARY

Therefore, an object of the disclosure is to provide a board management controller and a method for storing sensor data related to a sensor in a board management controller that can alleviate at least one of the drawbacks of the prior art.

According to a first aspect of the disclosure, the board management controller includes a storage module, and a processing module electrically connected to the storage module. The storage module includes a storage area and a buffer area each storing sensor data related to the sensor. The method is to be implemented by the processing module and includes steps of:
  storing, in the storage area of the storage module, an entry of sensing data that is latest collected from the sensor to replace content of the sensor data that is currently stored in the storage area;
  after storing the entry of sensing data in the storage area, assigning the buffer area with a locked state, and then copying the sensor data from the storage area to the buffer area to replace the sensor data that is currently stored in the buffer area, the processing module not responding to a request to access the sensor data when the buffer area is assigned with the locked state; and
  after copying the sensor data from the storage area to the buffer area, assigning the buffer area with an unlocked state, the processing module responding to the request to access the sensor data when the buffer area is assigned with the unlocked state.

According to a second aspect of the disclosure, the board management controller includes a storage module and a processing module.

The storage module includes a storage area and a buffer area, each of which stores sensor data related to the sensor.

The processing module is electrically connected to the storage module, and is configured to store, in the storage area of the storage module, an entry of sensing data that is latest collected from the sensor to replace content of the sensor data that is currently stored in the storage area, after storing the entry of sensing data in the storage area, assign the buffer area with a locked state, and then copy the sensor data from the storage area to the buffer area to replace the sensor data that is currently stored in the buffer area, the processing module not responding to a request to access the sensor data when the buffer area is assigned with the locked state, and after copying the sensor data from the storage area to the buffer area, assign the buffer area with an unlocked state, the processing module responding to the request to access the sensor data when the buffer area is assigned with the unlocked state.

According to a third aspect of the disclosure, the board management controller includes a storage module, and a processing module electrically connected to the storage module. The storage module includes a storage area and a buffer area each storing sensor data related to the sensor. The method is to be implemented by the processing module and includes steps of:
  storing, in the storage area of the storage module, an entry of sensing data that is latest collected from the sensor to replace content of the sensor data that is currently stored in the storage area;
  after storing the entry of sensing data in the storage area, copying the sensor data from the storage area to the buffer area to replace the sensor data that is currently stored in the buffer area; and
  upon receiving a request to access the sensor data, responding to the request by reading the sensor data from the buffer area.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
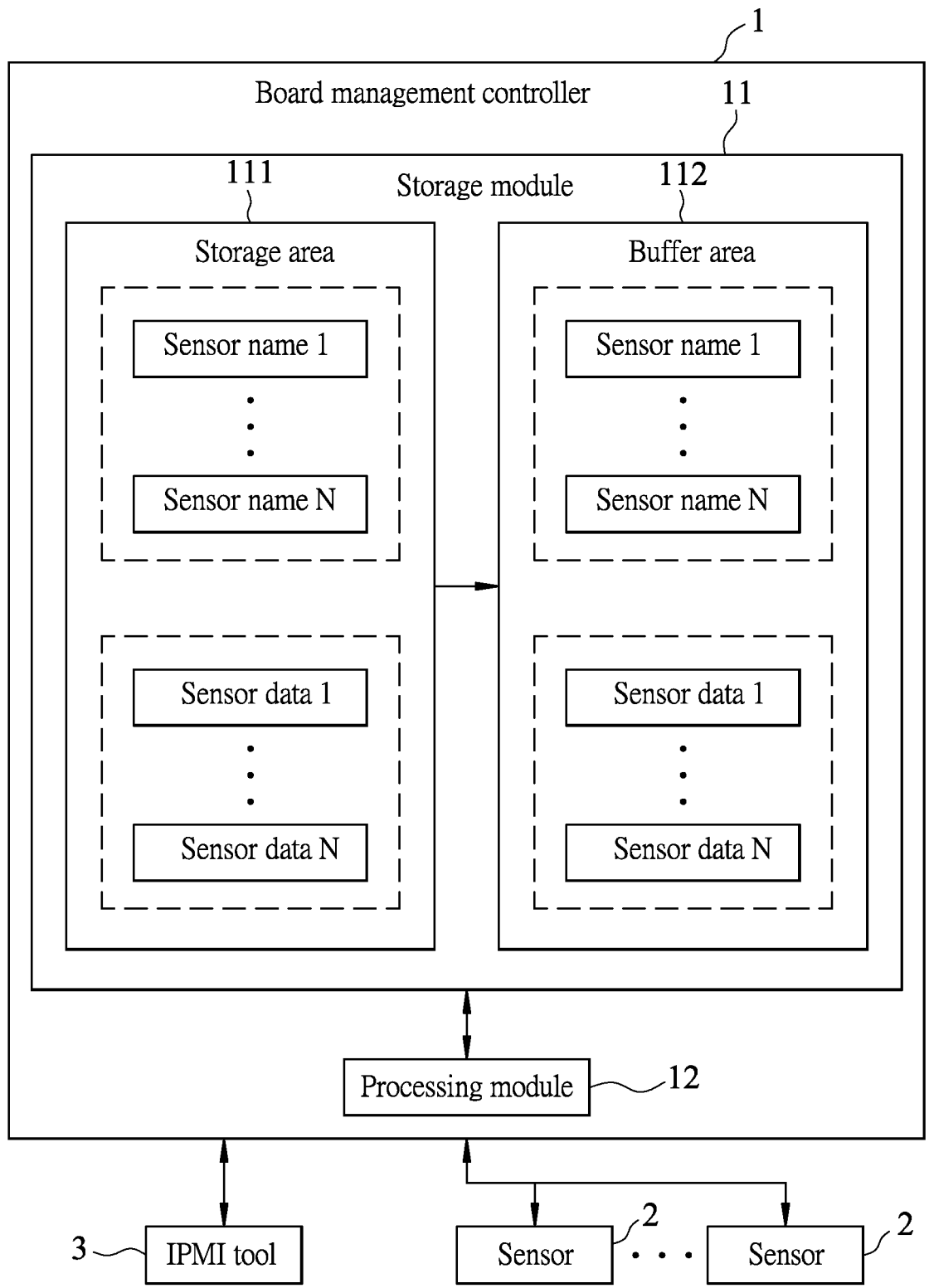
FIG. 1 is a block diagram illustrating a board management controller according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a board management controller 1 according to the disclosure is illustrated. The board management controller 1 is electrically connected to an intelligent platform management interface (IPMI) tool 3, and a number N of sensors 2, where N is a positive integer (i.e., N=1, 2, 3 . . . ). The board management controller 1 is adapted to be used for storing sensor data related to the sensors 2. Each of the sensors 2 is exemplarily a temperature sensor, a voltage sensor, a current sensor or the like, but is not limited thereto.

The board management controller 1 includes a storage module 11, and a processing module 12 that is electrically connected to the storage module 11.

The storage module 11 may be implemented by random access memory (RAM), double data rate synchronous dynamic random access memory (DDR SDRAM), read only memory (ROM), programmable ROM (PROM), flash memory, a hard disk drive (HDD), a solid state disk (SSD), electrically-erasable programmable read-only memory (EEPROM) or any other volatile/non-volatile memory devices, but is not limited thereto. The storage module 11 includes a storage area 111 and a buffer area 112 each storing sensor data related to the sensors 2. In particular, the processing module 12 is configured to partition the storage module 11 into the storage area 111 and the buffer area 112. Upon partitioning the storage module 11 into the storage area 111 and the buffer area 112, for each of the sensors 2, the processing module 12 is further configured to initialize the storage area 111 by storing a pair of a default value and a sensor name for the sensor 2 as content of the sensor data in the storage area 111, and after initializing the storage area 111, to initialize the buffer area 112 by copying the sensor data (i.e., the pair of the default value and the sensor name for the sensor 2) from the storage area 111 to the buffer area 112. In some embodiments, the processing module 12 is configured to initialize the storage area 111 by storing only the default value for the sensor 2 as the content of the sensor data in the storage area 111, and after initializing the storage area 111, to initialize the buffer area 112 by copying the sensor data (i.e., the default value for the sensor 2) from the storage area 111 to the buffer area 112.

The processing module 12 may be implemented by a processor, a central processing unit (CPU), a microprocessor, a micro control unit (MCU), a system on a chip (SoC), or any circuits configurable/programmable in a software manner and/or a hardware manner to implement functionalities discussed in this disclosure.

For each of the sensors 2, the processing module 12 is configured to store, in the storage area 111 of the storage module 11, an entry of sensing data that is latest collected from the sensor 2 to replace content of the sensor data that is currently stored in the storage area 111. The entry of sensing data contains a pair of detection information (e.g., a voltage value) and a sensor name (e.g., "Voltage sensor") for the sensor 2 (e.g., a voltage sensor). After storing the entry of sensing data in the storage area 111, the processing module 12 is configured to assign each of the storage area 111 and the buffer area 112 with a locked state, and then to copy the sensor data from the storage area 111 to the buffer area 112 to replace the sensor data that is currently stored in the buffer area 112. After copying the sensor data from the storage area 111 to the buffer area 112, the processing module 12 is configured to assign each of the storage area 111 and the buffer area 112 with an unlocked state. The processing module 12 does not respond to a request to access the sensor data when the buffer area 112 is assigned with the locked state, and responds to the request to access the sensor data when the buffer area 112 is assigned with the unlocked state. In some embodiments, the processing module 12 is configured to assign the storage area 111 with the locked state before storing the entry of sensing data in the storage area 111, and to assign the storage area 111 with the unlocked state upon storing the entry of sensing data in the storage area 111. In some embodiments, the entry of sensing data does not contain the sensor name and contains only the detection information, and hence only the detection information is stored in the storage area 111 and only the detection information is copied from the storage area 111 to the buffer area 112.

It is worth to note that assigning each of the storage area 111 and the buffer area 112 with one of the locked state and the unlocked state may be implemented by using a flag in a register or memory to record the one of the locked state and the unlocked state, but is not limited thereto. In some embodiments, assigning each of the storage area 111 and the buffer area 112 with the locked state is implemented by using mutual exclusion (Mutex) for preventing said each of the storage area 111 and the buffer area 112 from concurrent access. Since implementation of the Mutex has been well known to one skilled in the relevant art, detailed explanation of the same is omitted herein for the sake of brevity.

Upon receiving the request to access the sensor data (which is related to at least one of the sensors 2), the processing module 12 is configured to assign the buffer area 112 with the locked state prior to responding to the request, to respond to the request by reading the sensor data (which is related to said at least one of the sensors 2) from the buffer area 112, and to assign the buffer area 112 with the unlocked state upon responding to the request.

It is worth to note that the request may be sent from the IPMI tool 3, and a timeout error will occur on the IPMI tool 3 when the IPMI tool 3 has not received the sensor data from the board management controller 1 in a preset time period since the request was sent. A conventional board management controller collects detection data from sensor(s) only upon receiving a request from the IPMI tool 3 to access the detection data, and responds to the request by transferring the detection data thus collected to the IPMI tool 3. However, collecting the detection data from the sensor(s) may be time consuming and may cause the timeout error to occur on the IPMI tool 3. In comparison, the board management controller 1 according to the disclosure stores the sensor data in the buffer area 112 in advance, and responds to the request by reading the sensor data from the buffer area 112. Thus, a time period required for responding to the request is reduced and occurrence of the timeout error may be prevented.

Figure 2:
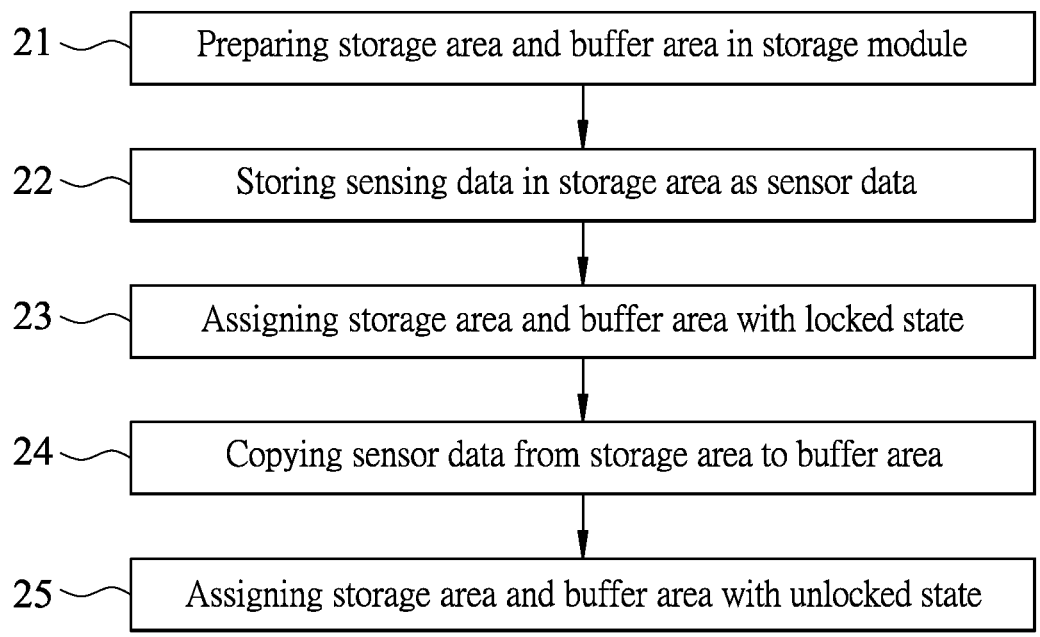
FIG. 2 is a flow chart illustrating a method for storing sensor data according to an embodiment of the disclosure.
Figure 3:
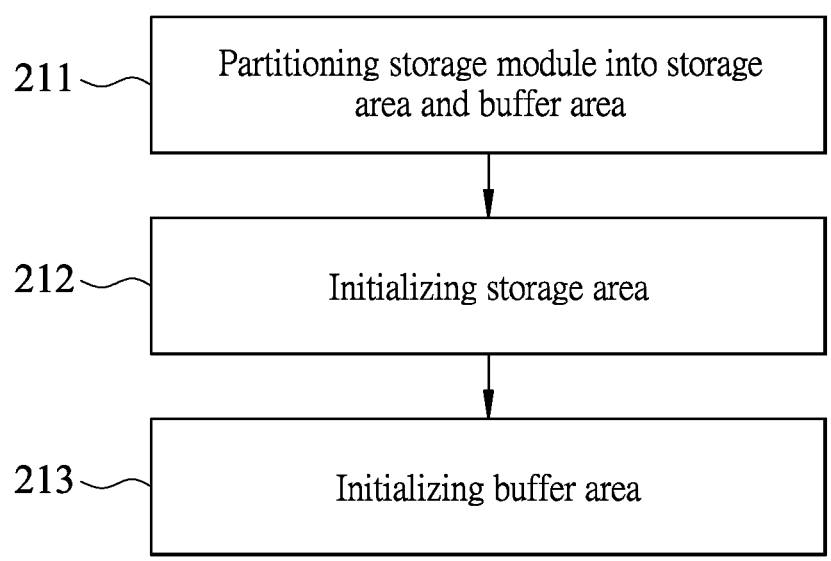
FIG. 3 is a flow chart illustrating sub-steps of step 21 in the method according to an embodiment of the disclosure.
Figure 4:
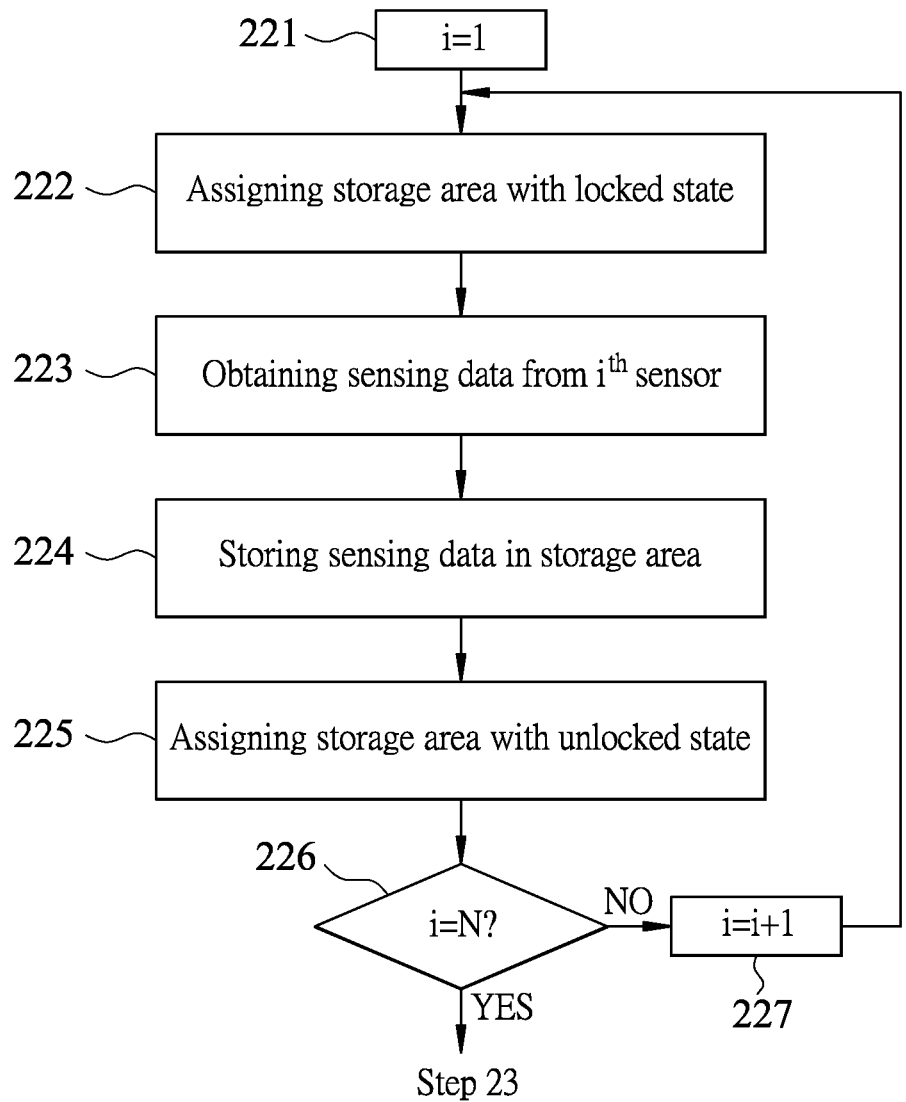
FIG. 4 is a flow chart illustrating sub-steps of step 22 in the method according to an embodiment of the disclosure.

Referring to FIGS. 2 to 4, a method for storing sensor data according to an embodiment of the disclosure is illustrated. The method is to be implemented by the processing module 12 of the board management controller 1 that is previously described. The method includes steps 21 to 25 that are illustrated in FIG. 2 and that are delineated below.

In step 21, the processing module 12 prepares the storage area 111 and the buffer area 112 in the storage module 11. Specifically, step 21 includes sub-steps 211 to 213 as shown in FIG. 3. In sub-step 211, the processing module 12 partitions the storage module 11 into the storage area 111 and the buffer area 112. For each of the sensors 2, the processing module 12 initializes the storage area 111 in sub-step 212 by storing the pair of the default value and the sensor name for the sensor 2 as the content of the sensor data in the storage area 111, and initializes the buffer area 112 in sub-step 213 by copying the sensor data from the storage area 111 to the buffer area 112. It is worth to note that in other embodiments where the storage area 111 and the buffer area 112 have been prepared in advance, step 21 may be omitted.

In step 22, for each of the sensors 2, the processing module 12 stores, in the storage area 111 of the storage module 11, the entry of sensing data that is latest collected from the sensor 2 to replace the content of the sensor data that is currently stored in the storage area 111. Specifically, step 22 includes sub-steps 221 to 227 as shown in FIG. 4 and delineated below.

In sub-step 221, the processing module 12 assigns a counter with an initial value that corresponds to a first one of the number N of the sensors 2. The initial value is exemplarily one herein (i.e., "i=1" shown in FIG. 4), but may be another integer (e.g., zero) in other embodiments.

For an $i^{th}$ one of the number N of the sensors 2 where i is an integer ranging from one to N, sub-steps 222 to 227 are executed.

In sub-step 222, the processing module 12 assigns the storage area 111 with the locked state.

In sub-step 223, the processing module 12 obtains an entry of sensing data that is latest collected from the $i^{th}$ one of the number N of the sensors 2 and that contains the detection information of latest detection of the $i^{th}$ one of the number N of the sensors 2.

In sub-step 224, the processing module 12 stores the entry of sensing data in the storage area 111 of the storage module 11 to replace content of the sensor data that is related to the $i^{th}$ one of the number N of the sensors 2 and that is currently stored in the storage area 111.

In sub-step 225, the processing module 12 assigns the storage area 111 with the unlocked state.

In sub-step 226, the processing module 12 determines whether a value of the counter is equal to N (i.e., "i=N?" shown in FIG. 4) so as to determine whether the entries of sensing data that are respectively related to all of the number N of the sensors 2 have been stored in the storage area 111. When it is determined that the value of the counter is equal to N, a procedure flow proceeds to step 23. On the other hand, when it is determined that the value of the counter is not equal to N, the procedure flow proceeds to sub-step 227.

In sub-step 227, the processing module 12 increases the value of the counter by one (i.e., "i=i+1" shown in FIG. 4). Then, the procedure flow returns to sub-step 222 for repeating steps of storing in the storage area 111 the entry of sensing data that is related to a remaining one of the number N of the sensors 2.

It is worth to note that in some embodiments, sub-step 222 is executed prior to sub-step 221 and sub-step 225 is executed subsequent to sub-step 226. That is to say, each of the steps of assigning the storage area 111 with the locked state and assigning the storage area 111 with the unlocked state is executed once for storing all of the entries of sensing data respectively collected from the number N of the sensors 2.

After the entry of sensing data has been stored in the storage area 111, steps 23 to 25 are executed.

In step 23, the processing module 12 assigns each of the storage area 111 and the buffer area 112 with the locked state.

In step 24, the processing module 12 copies the sensor data from the storage area 111 to the buffer area 112 to replace the sensor data that is currently stored in the buffer area 112.

In step 25, the processing module 12 assigns each of the storage area 111 and the buffer area 112 with the unlocked state.

Figure 5:
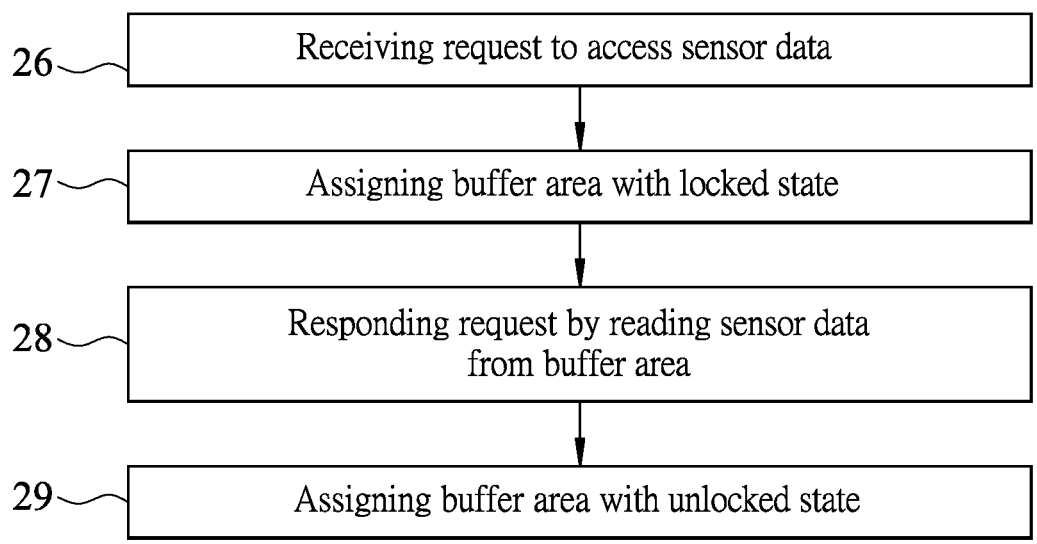
FIG. 5 is a flow chart illustrating a method for accessing sensor data according to an embodiment of the disclosure.

Referring to FIG. 5, a method for accessing sensor data according to an embodiment of the disclosure is illustrated. The method is to be implemented by the processing module 12 of the board management controller 1 that is previously described. The method includes steps 26 to 29 delineated below.

In step 26, the processing module 12 receives the request to access the sensor data that is related to at least one of the sensors 2.

In step 27, the processing module 12 assigns the buffer area 112 with the locked state.

In step 28, the processing module 12 responds to the request by reading from the buffer area 112 the sensor data that is related to said at least one of the sensors 2.

In step 29, the processing module 12 assigns the buffer area 112 with the unlocked state.

In some embodiments, each of the storage area 111 and the buffer area 112 would not be assigned with any one of the locked state and the unlocked state.

For example, in one embodiment, a board management controller 1 includes a storage module 11, and a processing module 12 that is electrically connected to the storage module 11. The storage module 11 includes a storage area 111 and a buffer area 112 each storing sensor data related to a number N of sensors 2, where N is a positive integer. For each of the sensors 2, the processing module 12 is configured to store, in the storage area 111 of the storage module 11, an entry of sensing data that is latest collected from the sensor 2 to replace content of the sensor data that is currently stored in the storage area 111, and after storing the entry of sensing data in the storage area 111, to copy the sensor data from the storage area 111 to the buffer area 112 to replace the sensor data that is currently stored in the buffer area 112. Upon receiving a request to access the sensor data, the processing module 12 is configured to respond to the request by reading the sensor data from the buffer area 112.

In one embodiment, a method for storing sensor data is to be implemented by the processing module 12 of the above-mentioned board management controller 1. The method includes steps of: for each of the sensors 2, storing, in the storage area 111 of the storage module 11, an entry of sensing data that is latest collected from the sensor 2 to replace content of the sensor data that is currently stored in the storage area 111; after storing the entry of sensing data in the storage area 111, copying the sensor data from the storage area 111 to the buffer area 112 to replace the sensor data that is currently stored in the buffer area 112; and upon receiving a request to access the sensor data, responding to the request by reading the sensor data from the buffer area 112.

To sum up, for the board management controller 1 and the method for storing sensor data according to the disclosure, the buffer area 112 is assigned with the locked state when the sensor data stored in the buffer area 112 is being updated. In this way, device(s) other than the board management controller 1 is prevented from accessing the sensor data during updating the sensor data stored in the buffer area 112, and thereby errors resulting from such simultaneous access to the sensor data may be avoided. Moreover, a backup of the sensor data stored in the storage area 111 is made in the buffer area 112, and the request to access the sensor data is responded by reading the backup stored in the buffer area 112. Therefore, safety and preservation of the sensor data may be enhanced. Furthermore, the request sent from the IPMI tool 3 may be responded in time to prevent the IPMI tool 3 from the timeout error due to the IPMI tool 3 having not received the sensor data from the board management controller 1 in the preset time period.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for storing sensor data related to a sensor in a board management controller, the board management controller including a storage module, and a processing module electrically connected to the storage module, the storage module including a storage area and a buffer area each storing sensor data related to the sensor, the method to be implemented by the processing module and comprising:
   storing, in the storage area of the storage module, an entry of sensing data that is latest collected from the sensor to replace content of the sensor data that is currently stored in the storage area;
   after storing the entry of sensing data in the storage area, assigning the buffer area with a locked state, and then copying the sensor data from the storage area to the buffer area to replace the sensor data that is currently stored in the buffer area, the processing module not responding to a request to access the sensor data when the buffer area is assigned with the locked state; and
   after copying the sensor data from the storage area to the buffer area, assigning the buffer area with an unlocked state, the processing module responding to the request to access the sensor data when the buffer area is assigned with the unlocked state.

2. The method as claimed in claim 1, further comprising partitioning the storage module into the storage area and the buffer area.

3. The method as claimed in claim 2, further comprising, upon partitioning the storage module into the storage area and the buffer area:
   initializing the storage area by storing a default value as the content of the sensor data in the storage area; and
   after initializing the storage area, initializing the buffer area by copying the sensor data from the storage area to the buffer area.

4. The method as claimed in claim 3, wherein:
   initializing the storage area is further to store a sensor name for the sensor; and
   initializing the buffer area is further to copy the sensor name from the storage area to the buffer area.

5. The method as claimed in claim 1, further comprising:
   upon receiving the request to access the sensor data, responding to the request by reading the sensor data from the buffer area.

6. The method as claimed in claim 5, further comprising:
   assigning the buffer area with the locked state prior to responding to the request; and
   assigning the buffer area with the unlocked state upon responding to the request.

7. A board management controller for storing sensor data related to a sensor, said board management controller comprising:
   a storage module including a storage area and a buffer area each storing sensor data related to the sensor; and
   a processing module electrically connected to said storage module, and configured to
      store, in said storage area of said storage module, an entry of sensing data that is latest collected from the sensor to replace content of the sensor data that is currently stored in said storage area,
      after storing the entry of sensing data in said storage area, assign said buffer area with a locked state, and then copy the sensor data from said storage area to said buffer area to replace the sensor data that is currently stored in said buffer area, said processing module not responding to a request to access the sensor data when said buffer area is assigned with the locked state, and
      after copying the sensor data from said storage area to said buffer area, assign said buffer area with an unlocked state, said processing module responding to the request to access the sensor data when said buffer area is assigned with the unlocked state.

8. The board management controller as claimed in claim 7, wherein said processing module is further configured to partition said storage module into said storage area and said buffer area.

9. The board management controller as claimed in claim 8, wherein said processing module is further configured to, upon partitioning said storage module into said storage area and said buffer area:
   initialize said storage area by storing a default value as the content of the sensor data in said storage area; and
   after initializing said storage area, initialize said buffer area by copying the sensor data from said storage area to said buffer area.

10. The board management controller as claimed in claim 9, wherein said processing module is configured to:
   initialize said storage area further by storing a sensor name for the sensor; and
   initialize said buffer area further by copying the sensor name from said storage area to said buffer area.

11. The board management controller as claimed in claim 7, wherein said processing module is further configured to:
   upon receiving the request to access the sensor data, respond to the request by reading the sensor data from said buffer area.

12. The board management controller as claimed in claim 11, wherein said processing module is further configured to:
   assign said buffer area with the locked state prior to responding to the request; and
   assign said buffer area with the unlocked state upon responding to the request.

13. A method for storing sensor data related to a sensor in a board management controller, the board management controller including a storage module, and a processing module electrically connected to the storage module, the storage module including a storage area and a buffer area each storing sensor data related to the sensor, the method to be implemented by the processing module and comprising:
- storing, in the storage area of the storage module, an entry of sensing data that is latest collected from the sensor to replace content of the sensor data that is currently stored in the storage area;
- after storing the entry of sensing data in the storage area, copying the sensor data from the storage area to the buffer area to replace the sensor data that is currently stored in the buffer area; and
- upon receiving a request to access the sensor data, responding to the request by reading the sensor data from the buffer area.

* * * * *